United States Patent [19]
Walker

[11] Patent Number: 5,282,966
[45] Date of Patent: Feb. 1, 1994

[54] PACKAGE FOR PERMEATION SEPARATION DEVICE

[75] Inventor: James B. Walker, Wilmington, Del.

[73] Assignee: E. I. Du Pont de Nemours and Company, Wilmington, Del.

[21] Appl. No.: 957,863

[22] Filed: Oct. 8, 1992

[51] Int. Cl.$^5$ ............................................. E01D 63/02
[52] U.S. Cl. ............................ 210/321.8; 210/321.89; 210/500.23
[58] Field of Search ............ 210/321.81, 321.6, 321.72, 210/321.78–321.8, 321.87–321.9, 500.23

[56] References Cited

U.S. PATENT DOCUMENTS

| | | |
|---|---|---|
| 3,228,876 | 1/1966 | Mahon . |
| 3,228,877 | 1/1966 | Mahon . |
| 3,339,341 | 9/1967 | Maxwell et al. . |
| 3,422,008 | 1/1969 | McLain . |
| 3,455,460 | 7/1969 | Mahon et al. . |
| 3,475,331 | 10/1969 | McLain . |
| 3,526,001 | 8/1970 | Smith . |
| 3,536,611 | 10/1970 | de Filippi et al. . |
| 3,832,830 | 9/1974 | Gerow . |
| 4,038,190 | 7/1977 | Baudet et al. ............... 210/321.81 |
| 4,207,192 | 6/1980 | Coplan et al. . |
| 4,666,469 | 5/1987 | Krueger et al. . |
| 4,676,808 | 6/1987 | Coplan . |
| 5,013,331 | 5/1991 | Edwards et al. . |

*Primary Examiner*—Frank Sever
*Attorney, Agent, or Firm*—Cary A. Levitt

[57] ABSTRACT

The invention is a membrane separation device having a housing which serves the dual role of a lightweight, impact-resistant shipping container and a recloseable vessel for the separation membranes. The housing reduces handling of the membranes, facilitates assembly of permeation systems and improves repair, replacement and inspection of membranes. The housing is preferably fabricated from expanded polystyrene. In an alternate embodiment, the configuration of the inside surface of the housing may be altered to provide a non-uniform or non-cylindrical annular space. The separation systems are particularly useful for gas separations.

8 Claims, 2 Drawing Sheets

PACKAGE FOR PERMEATION SEPARATION DEVICE

FIELD OF THE INVENTION

This invention relates to a device for contacting bundled hollow fiber membranes with a fluid mixture in order to separate the components of the mixture by passage of the more permeable components through the membranes.

BACKGROUND OF THE INVENTION

The use of membranes to effect separation of gas/gas, liquid/liquid, and liquid/solid mixtures and solutions has achieved general industrial applicability by various methods, among them being ultrafiltration, reverse osmosis and dialysis. In general, membrane elements associated with these processes are contained in vessels called permeators, generally comprising a container or housing having various inlet and outlet ports and an assembly of membranes within said container. The internal configurations are so arranged as to permit the introduction of a feed stream with or without pressure on the upstream face of the membranes, means for collecting permeate which passes through the membranes and emerges on their downstream faces, and means for keeping feed and permeate materials from commingling.

The subject invention is concerned with hollow fibers assembled in modular form to provide the desired separation. Hollow fiber permselective separation devices are particularly useful for separating the components of gaseous mixtures. The invention is particularly useful for permeators in which the so-called shell side is at about atmospheric pressure.

Hollow fiber membrane devices are used for selective separation of at least one fluid component from a mixture of fluids or a solution. Such devices generally comprise a plurality of hollow fiber membranes, the membranes being selectively permeable to at least one component of the fluid mixture. The hollow fiber membranes are disposed inside a shell, housing or vessel. The housing has at least one inlet for bringing a fluid feed into contact with one surface of the hollow fiber membranes. A means to promote uniform distribution of the fluid feed is desirable. At least one outlet for discharge of the fluid which does not permeate through the membrane and at least one outlet for fluid which permeates through the membrane is also required. The hollow fibers are embedded in at least one tubesheet. The fiber bores communicate either with the permeate outlet or the fluid inlet. The tubesheet sealingly engages the inner surface of the housing. The vessel serves to support the pressure of one of the fluid streams and to isolate the fluid streams. The vessel and the ancillary hardware also assists in maintaining the position of the separation device during operation. Multiple separation devices may be stacked or connected in series or parallel alignment.

The membrane material and form employed may be any suitable material capable of effecting the desired separation. For example, cellulose derivatives, polyamides, polyimides, polysulfones, and polystyrenes or blends thereof have found utility. Also, hollow fiber membranes may be composite, asymmetric or dense film.

The variety of membrane materials to effect various separations is abundant; however, the utility of many membranes is limited to narrow applications. For example, one membrane may be suitable for the separation of oxygen/nitrogen gas mixtures, but may be unsuitable for the separation of carbon dioxide/nitrogen gas mixtures. Likewise, one membrane may be suitable for desalination of brackish water but may be unsuitable for the desalination of sea water. The concentrations of the components in the fluid to be separated and the desired flow rates are also factors to be considered.

Because of the limited utility of many membranes, it is desirable to have a separation device which readily allows the exchange or replacement of the bundle of membranes.

It is also known that the operational properties of most membranes deteriorate over time. The deterioration of operational properties may be a result of degradation of the membrane material, damage to the membranes or fouling. Fouling of the membranes is a problem which requires immediate attention and often requires replacement of the separation device.

The problem of membrane fouling due to retention of suspended particles is especially prominent in conventional separation devices. Feed streams inevitably contain varying amounts of suspended particulate matter or biota. Although extreme precautions are generally taken to prefilter the feed stream or otherwise remove the suspended particles and biota prior to admitting the feed to the permeators, the conventional hollow fiber separation devices, ultimately become collectors for much of this material. Bundles, especially tightly packed hollow fiber bundles, develop occluded regions and lose effective membrane areas.

Another problem with the operation of hollow fiber membrane separation device arises from the lack of control of flow of the permeate and/or sweep fluid on the shell side of the separation device in order to enhance the performance of the device.

Permeation membranes are also known to break or burst, particularly at high operating temperatures and pressures. The separation of gases is most efficient at high pressures because the rates of permeation of gases through polymeric membranes are, in general, proportional to the differences in the pressures of the gases on the two sides of the membranes; such separations also are more rapid at higher temperatures. Operation at the highest practical pressures and temperatures is, therefore, important in the commercial use of such separation devices. The breakage of membranes is a particular problem in the areas adjacent to the tubesheet, especially at high operating pressures. As few as 0.1% broken fibers can have a great adverse effect on the fluid separation properties of the separation device.

Operation of permeators at high temperatures (often 80° C.) often necessitates the use of insulation around the permeator. The permeators are conventionally wrapped with an insulating material, for example fiberglass, foam, blankets and the like. Alternatively, the separation device may be placed inside a container containing an insulating material or encased in an insulating material. In any event, an insulator must be added to the separation device in order to reduce heat loss and maintain steady-state operation.

Bundles of membranes must be carefully packed for shipment. Typically, the bundle is wrapped with a "bubble wrap", cardboard, foam or other material to protect the membranes. The wrapped bundle may then be placed in a cardboard container, usually a cylindrical container. One or more cardboard containers may then be placed in a wooden crate for shipment. The packaging material tends to be expensive and bulky. In addition, the packing and shipping process subjects the membranes to excessive handling, often resulting in damage or distortion to the fragile membranes ultimately decreasing the performance of the separation device. Moreover, the bundles must ultimately be unpacked, unwrapped and inserted into the housing of the separation device prior to operation. At that time, the membranes may be damaged from exposure to the environment.

Bundles of membranes may, alternatively, be shipped in steel or fiberglass vessels; i.e., the shells used during operation. The vessels, usually cylindrical shells, may be strapped to a wooden pallet. Packing the bundles directly in the pressure vessels is more convenient and reduces handling, but results in bulky, heavy shipments, ultimately increasing the cost of shipping.

Prior art separation devices are abundant. For example, U.S. Pat. No. 3,339,341 discloses a standard device for the separation of the components of a fluid mixture by the selective permeation of the components through the walls of hollow fiber membranes. The device consists essentially of a bundle of suitable hollow fiber membranes surrounded longitudinally by at least one elongated flexible porous sleeve member, a cast resin tubesheet at each end of the bundle, the hollow fiber membranes being embedded in and extending through the tubesheet, a shell surrounding the bundle and sealed thereto at each end, means for introducing a fluid mixture into the interiors of the hollow fiber membranes at one end of the bundle (that is, fiber side or bore side feed), means for removing from the interiors of the hollow fiber membranes at the other end of the bundle the portion of the fluid mixture which does not permeate through the walls of the hollow fiber (that is, fiber side or bore side recovery), and means for removing from the shell the portion of the fluid mixture which permeates through the hollow fiber walls (that is, shell side recovery). Similar separation devices are disclosed in U.S. Pat. Nos. 3,228,876; 3,228,877; 3,422,008; 3,455,460; 3,475,331; 3,526,001; and 3,536,611.

These prior art separation devices do not, however, provide a permeator which may readily be opened and reclosed to repair, clean or replace the bundle of separation membranes. Moreover, the prior art separation devices do not provide a device for the convenient, cost-effective, lightweight shipment of membrane bundles which may simultaneously be used as a recloseable housing or shell for the membranes. Still further, prior art separation devices do not provide a device in which the housing is fabricated from an insulating material, while still maintaining the advantages of prior art devices. Also, prior art separation devices do not readily permit modifications to the size and configuration of the annular space around the bundles so as to permit control of the flow of the permeate and/or sweep fluid on the shell side of the device.

SUMMARY OF THE INVENTION

This invention is a housing for separation devices which performs a multitude of functions. The housing may be used as a shipping package for the transportation of bundles of separation membranes. The housing may be readily adapted for use as a shell or vessel for the separation device. Such a housing may readily be opened and then reclosed for purposes of repairing, cleaning or replacing the separation membranes or changing the size and configuration of the annular space, and also may be fabricated from an insulating material such as expanded polystyrene for high temperature permeations.

The separation device comprises:

1. one or more bundles of membranes which at each end are embedded in and extend through a tubesheet; and 2. a housing surrounding the bundle or bundles and providing an annular space for fluid around the bundle or bundles and sealed thereto in a fluid-tight relationship at each end having a tubesheet, said housing being recloseably affixed around the bundle or bundles.

The device may also comprise:

3. means for introducing a fluid mixture into the device so as to produce a permeate portion passing through the membranes and a non-permeate portion which does not pass through the membranes;

4. means for removing the non-permeate portion of the fluid mixture from the device;

5. means for removing the permeate portion of the fluid mixture from the device; and 6. a non-cylindrical or non-uniform annular space surrounding the bundles.

DETAILED DESCRIPTION OF THE INVENTION

For purposes of simplicity the package/vessel for the separation device is described herein and in the claims as a "housing"; however, the housing has multiple roles of providing a strong, lightweight, inexpensive, thermally insulating shell or vessel for the separation device while simultaneously providing a lightweight, inexpensive, protective package for the bundle of separation membranes.

The invention is not limited to any particular configuration of a hollow fiber membrane separation device. However, the standard configuration described hereinbefore is preferred. The feed fluid to be separated flows from inside the fiber bundle external to the fibers outward. The shell side of the permeator operates preferably at, or near, atmospheric pressure. One knowledgeable in the membrane field would recognize that other configurations for the permeator are feasible. For example, hollow fibers may be arranged such that both ends of the fiber protrude through a single tubesheet or a single central tubesheet may be used. Also, the bundle of membranes may have a non-circular cross-section with non-uniform packing density of membranes.

It should be noted that a number of separation devices can be stacked or connected in parallel or series to increase capacity and/or to improve separation. In addition, each permeator may house more than one bundle of separation membranes. The skilled artisan can readily adapt the teachings herein to such configurations.

Figure 1:
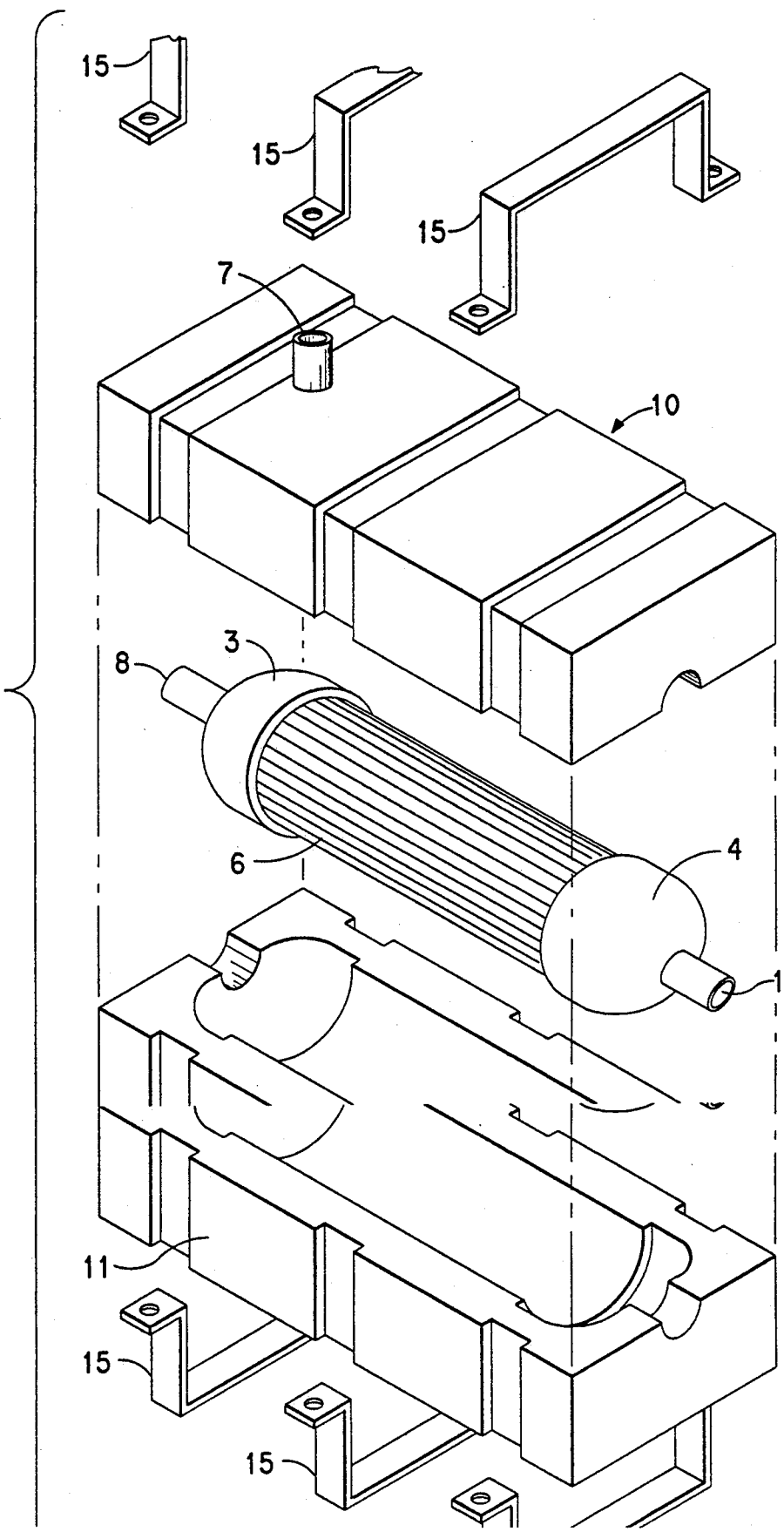
FIG. 1 is an exploded view of a separation device with the recloseable package/housing.

FIG. 1 depicts a hollow fiber membrane separation device. The fluid mixture to be separated is introduced into the inlet 1 and is then distributed via a fluid feed distribution means (not shown). The feed distribution means passes through a first tubesheet and terminates in a second tubesheet. A plurality of hollow fiber membranes, i.e., a bundle, 6 are assembled generally parallel with and preferably concentric about the feed distribution means. In this embodiment, the ends of the bundle 6 and the accompanying tubesheets are covered with endcaps 3 and 4. Some of the feed fluid passes axially but principally radially through the bundle of hollow fibers 6 to an outlet 7 in the housing enclosing the bundle. The balance of the feed fluid which does not selectively permeate through the membranes passes linearly through the hollow fibers and discharges at port 8.

The housing is a recloseable package or shell. The important features of the housing are exemplified in FIG. 1. First, the housing must be sealable to form a vessel. The housing must be recloseable. In the embodiment shown in FIG. 1, the housing comprises two pieces, a top piece 10 and a bottom piece 11. The pieces are fabricated so as to securely hold a bundle of membranes when the separation device is sealed. In addition, the housing is machined or molded to accommodate inlet port 1 and discharge ports 7 and 8, and end caps 3 and 4. The two pieces of the housing may be closed by means of the brackets 15. The brackets may be secured by conventional means such as a bolt and nut (not shown). The brackets may also readily be unsecured and removed to allow the housing to be opened and reclosed. It is apparent to one skilled in the art that many different closure means may be used to securely seal the housing around the bundle such as elastic bands, plastic or metal straps, mechanical clamps or the like.

The separation device housing may have any number of conventional closure means. Such closure means must enable the housing to be sealed, to form a seal, and then readily reopened. The closure means shown in FIG. 1 is for convenience only. It is also possible to use a multitude of conventional devices to enhance the opening and closure of the housing, such as a hinge which fixedly holds two edges of the housing pieces 10 and 11. The shape and size of the housing are dictated by the shape and size of the bundle. The thickness of the housing is dictated largely by the operating pressure of the device and the housing's material of construction.

The housing may be fabricated from a wide variety of materials, including expanded polystyrene, expanded polyurethane, expanded polyethylene, fiberglass, asbestos, graphite, wood such as balsa wood, and the like. It is preferred that the material of construction be lightweight, strong to prevent damage to the membranes and have good insulating properties. Preferably, the housing material may be easily machined or molded to the desired size and configuration and to accommodate hardware such as inlet ports and discharge ports. Expanded polystyrene is the preferred material of construction due to its low density, impact resistance and good insulation properties. It is also possible to use more than one material of construction, such as an expanded polystyrene housing encased in a metal jacket or cover. Preferably, the material of construction is strong enough to withstand elevated permeate side pressures.

For the sake of simplicity, minor or optional features known in the art, such as O-ring seals between the tubesheet and the housing, tubesheet supports, and the hardware on the housing, are not depicted in the figures.

Figure 2:
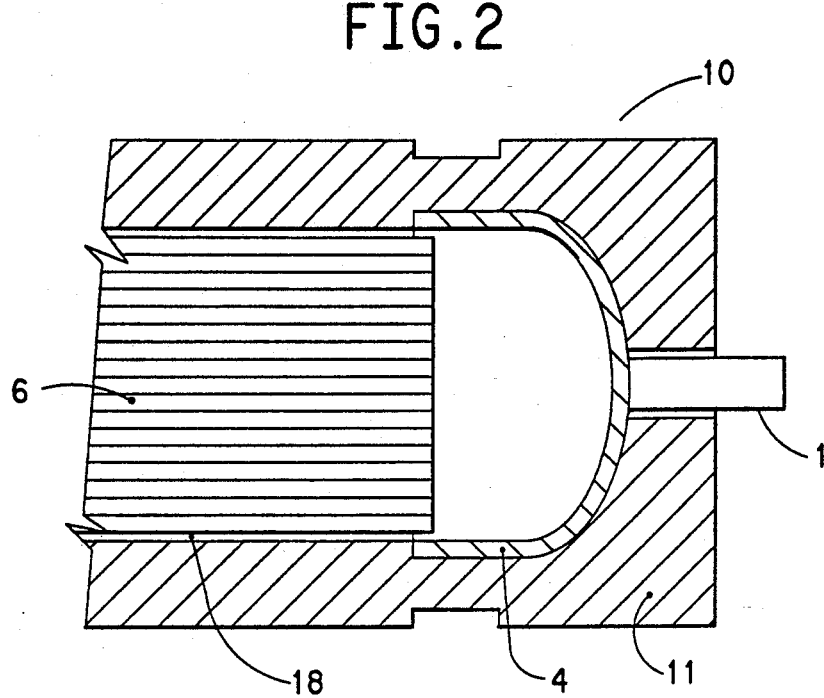
FIG. 2 is a cross-section of one end of the separation device.

FIG. 2 is a cross-sectional view of a membrane separation device sealed in the package/housing. The housing pieces 10 and 11 are secured firmly around the bundle of membranes 6 with endcap 4. Inlet port 1 extends through from the endcap 4 through the housing so as to allow fluid communication between the bundle and the inlet fluid.

For high temperature operation, heating coils or other heating means may be wrapped around, embedded inside or contained within the housing in order to facilitate heating of the membranes.

Optionally, a sweep fluid could be introduced into one header space and removed through the outlet in the other header space to assist in the collection of the permeate. The end cap 4 defines a header space (not shown) for collection of the fluid which has passed through the membranes. The housing pieces 10 and 11 surround the bundle of membranes 6, and defines an annular space 18.

It is well known that permeation separation devices operate at elevated pressures. For example, the transmembrane pressure, i.e., the pressure differential between the feed side of the hollow fiber membrane and the pressure on the permeate side of the membrane during operation, must be sufficient to promote permeation through the membrane at an acceptable rate but not so great that the hollow fiber is damaged or collapses. The operable range of transmembrane pressures depends on numerous factors, including the membrane material, the thickness of the membrane, the fluids being separated and the temperature during operation. Typically, a transmembrane pressure of at least about 10 psi (69 kPa), preferably at least about 40 psi (276 kPa), is employed. The upper limit on the transmembrane pressure is dictated by the strength of not only the hollow fiber membrane but also the ability of the associated lines and equipment to withstand pressure. Generally, transmembrane pressures with certain thin-wall hollow fibers above about 1500 psi (10340 kPa), while operable, are not desirable. For best performance it is generally desirable to maintain as low a pressure as practical on the permeate side during operation. Preferably, the permeate side (or shell side) operates at or near atmospheric permeate side pressure. Housings fabricated from lightweight materials such as expanded polystyrene may not be able to withstand elevated permeate side pressure.

The inventive housing solves problems known in the prior art, without losing the advantages of prior art separation devices. Particularly, the housing advantageously provides a simple, effective package which also may function as a vessel for the membranes. The housing protects the membranes from damage due to handling or the environment, serves to isolate the various fluid streams, supports the pressure of one of the fluid streams, and assists in maintaining the position of the separation device during operation. The housing is a shipping package which is lightweight and impact resistant to prevent damage to the membranes. In addition, handling of the membranes is greatly reduced because the bundles are not transferred from a shipping package to a different vessel, thereby simplifying the assembly of the separation device and further reducing handling of the membranes which further reduces damage to the membranes.

The housing may advantageously be fitted with hardware such as inlet ports and discharge ports. It is readily apparent that the inventive housing allows the separation device to be directly connected to the desired fluid separation system without any handling of the membrane bundle. The ease of connecting the device also facilitates the testing and evaluation of a variety of different membranes.

The housing may be opened and reclosed, which advantageously allows the membrane bundle to (i) be placed in the housing for shipment, (ii) to be removed for inspection, repair or replacement, and (iii) to be cleaned, especially in the case of fouling.

Moreover, the housing may be fabricated from a material having good insulation properties. As a result, in high temperature permeations, the need for additional insulation material is reduced or eliminated.

The size, shape and configuration of the housing may readily be adapted to the desired configurations of the separation device and the tubesheets. The separation devices may readily be stacked or connected in parallel or in series. Multiple bundles may readily be incorporated into one separation device, if desired. Separation devices having housings fabricated from expanded polystyrene, expanded polyurethane, expanded polyethylene, wood or the like are particularly useful for applications in which the separation device has non-uniform or non-traditional sizes or configurations. Housing fabricated from such materials may be cut or machined at the time of installation of the separation device. This also assists in inventory control of separation devices; particularly devices which until now must be custom-made.

The size, shape and configuration of the housing may also readily be adapted to alter the annular space surrounding the bundles so as to control the flow of permeate and/or sweep fluid so as to enhance the performance of the separation devices, including alleviating any adverse concentration gradients in the annular space. Such concentration gradients may adversely affect the performance of the separation device, particularly the selectivity of the device. It is possible to enhance control of the permeate fluid and/or sweep fluid by altering the configuration of the annular space. The annular space may have an irregular or non-uniform shape for purposes of altering the normal flow of the permeate in the annular space. For example, the annular space may have grooves or protrusion or be tapered or truncated rather than cylindrical. For purposes of this specification and the claims, the modified annular space is referred to as "non-uniform". The "non-uniform" space is not limited but is intended to encompass any configuration which may alter or improve the fluid flows.

The housing of the present invention is particularly suited to controlling flows by providing a non-uniform annular space. First, the inventive separation devices makes it possible to readily configure the annular space. Secondly, the separation device is resealable so as to permit the operator to alter the configuration by opening it, adjusting the size, shape and configuration of the annular space and then resealing the device. In prior art separation devices the housing is customarily cylindrical (on both inner and outer surfaces) and not recloseable; the bundles are inserted through an open end which is subsequently sealed. Such devices will not permit adjustments to the size, shape and configuration of the annular space. Moreover, the bundles cannot be inserted into the open end of housings with irregular inner surfaces. Second, the size, shape and configuration of the non-uniform annular may be adjusted with shims or a housing insert (such as a wedge shaped piece or piece with horizontal or vertical grooves) or like means.

The non-uniform annular space is particularly useful to controlling flows in devices having countercurrent flow.

Figure 3:
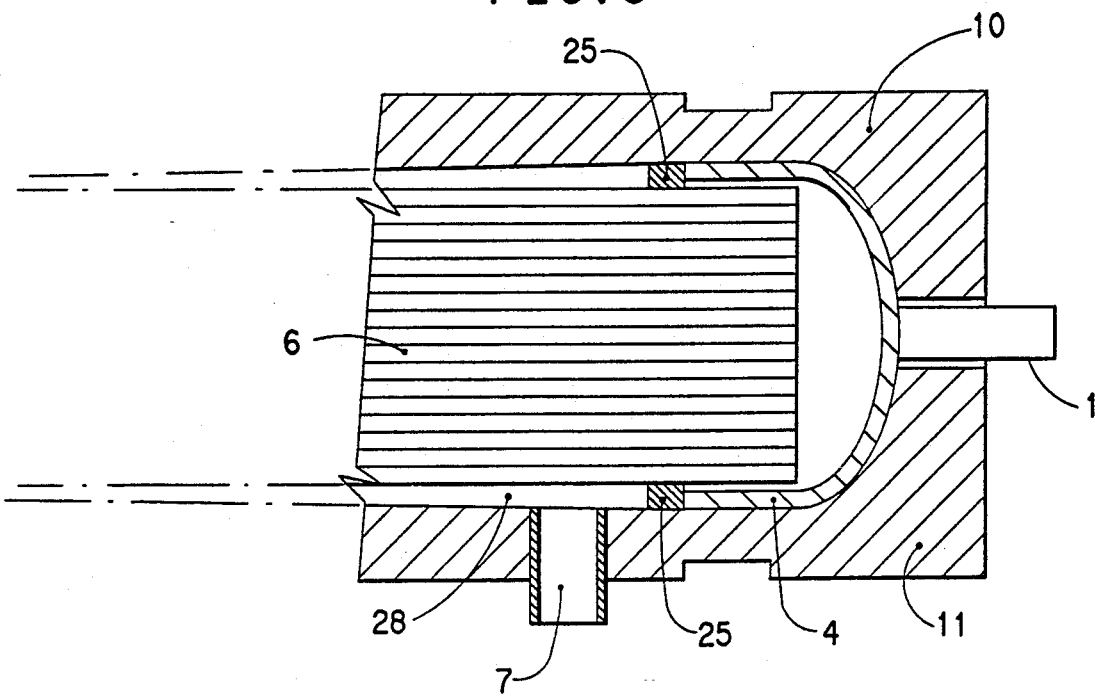
FIG. 3 is a cross-section of one end of an alternate embodiment of the separation device showing a shim to create a nonuniform annular space around the bundle of membranes.

FIG. 3 shows a cross-section of one end of a separation device in which the annular space is tapered. The housing pieces 10 and 11 are secured firmly around the bundle of membranes 6 with endcap 4. Inlet port 1 extends through from the endcap 4 through the housing so as to allow fluid communication between the bundle and the inlet fluid.

Optionally, a sweep fluid could be introduced into one header space and removed through the outlet in the other header space to assist in the collection of the permeate. The housing pieces 10 and 11 surround the bundle of membranes 6, and define the tapered annular space 28. The outlet port 7 in the housing piece 11 allows the fluid to discharge from the device. A ring 25 is removably secured to the inner surface of housing 8. The ring may be an O-ring or similar device. Preferably, the ring in one continuous piece, but may also be two or more piece. For example, it may be convenient or desirable to place one half-ring into housing piece 10 and another half ring into housing piece 1 1 prior to closing and sealing the housing. The ring functions as a "shim", so as to define the non-uniform annular space. An insert may also be removably secured to the inside wall of the housing 8 so as to define the annular space 18. The size, shape, configuration and material of construction of the shim or insert is not critical. Multiple shims may be used to define a highly irregular annular space, if desired. The shims or inserts are preferably in fluidtight contact with the inner wall of the housing and the outer surface of the bundle tubesheet.

The configuration of the separation device and the tubesheet contained therein are well-known. As previously indicated, the cross-sectional configuration of tubesheets is usually generally circular. It is also apparent that the cross-sectional configuration may be in any other form such as triangular, trilobal, square, rectangular, trapezoidal, pentagonal, hexagonal, free form, or the like. The maximum cross-sectional dimension of the tubesheet may also vary substantially. For instance, the maximum cross-sectional dimension of the tubesheet may be as little as 5 centimeters for laboratory-scale experimentation to 50 centimeters or more, preferably 10 to 30 centimeters, for treating large volume fluid streams. The face of the tubesheet may be any suitable configuration and is generally substantially the same configuration as the cross-sectional configuration of the tubesheet. The face may be substantially flat or may be curved or irregular in surface contour. The tubesheet may contain one or more bundles of separation membranes.

The bundle of membranes may be of any convenient configuration, e.g., circular, hexagonal, trilobal, or the like in cross-section and may have ridges, grooves, or the like extending inwardly or outwardly from the walls of the membranes. In the case of hollow fiber separation membranes, generally, the maximum outside cross-sectional dimension of the hollow fiber membranes is at least about 50 microns and often is up to about 500 or more microns. In many instances, it is preferred that the maximum interior dimension (maximum bore dimension) of the hollow fiber membranes be at least about 30 to about 300 microns. The ratio of the wall thickness to maximum outside dimension of the hollow fiber membranes is frequently about 0.05 to 0.50, preferably, about 0.2 to 0.4. The hollow fiber membranes may be isotropic, i.e., having substantially the same structure throughout the thickness of the wall, or anisotropic, i.e., having one or more regions within the thickness of the wall having a more dense structure. The hollow fiber membranes are useful in fluid separations, i.e., they may serve as the support for coating which provides selective separation or as the medium which effects the separation.

Advantageously, this invention enables a wide range of materials to be employed for the fabrication of the membranes. Preferably, the materials used to fabricate the membranes are elastic and do not smear when machined or cut. The material for the membranes may be synthetic or natural and may be inorganic, organic or organic mixed with inorganic. Typical inorganic materials for the membranes may be glasses, ceramics, cermets, metals, and the like. The organic materials are generally polymeric in nature. Typical polymers suitable for the membranes can be substituted or unsubstituted polymers and may be selected from polysulfones; poly(styrenes), including styrene-containing copolymers such as acrylonitrile-styrene copolymers, styrene-butadiene copolymers and styrene-vinylbenzylhalide copolymers; polycarbonates; cellulosic polymers, such as cellulose acetate-butyrate; cellulose propionate, ethyl cellulose, methyl cellulose, nitrocellulose, etc.; polyamides and polyimides, including aryl polyamides and aryl polyimides; polyethers; poly(arylene oxides) such as poly(phenylene oxide) and poly(xylene oxide); poly(esteramide-diisocyanate); polyurethanes; polyesters (including polyarylates) such as poly(ethylene terephthalate), poly(alkyl methacrylates), poly(alkyl acrylates), poly(phenylene terephthalate), etc.; polysulfides; poly(siloxanes); polymers from monomers having the alpha-olefinic unsaturation other than mentioned above such as poly(ethylene), poly(propylene), poly(butene-1), poly(4-methyl pentene-1), polyvinyls, e.g., poly(vinyl chloride), poly(vinyl fluoride), poly(vinylidene chloride), poly(vinylidene fluoride), poly(vinyl alcohol), poly(vinyl esters) such as poly(vinyl acetate) and poly(vinyl propionate), poly(vinyl pyridines), poly(vinyl pyrrolidones), poly(vinyl ethers), poly(vinyl ketones), poly(vinyl aldehydes) such as poly(vinyl formal) and poly(vinyl butyral), poly(vinyl amides), poly(vinyl amines), poly(vinyl phosphates), and poly(vinyl sulfates), polyallyls; poly(benzobenzimidazole); polyhydrazides; polyoxadiazones; polytriazoles; poly(benzimidazole); polycarbodiimides; polyphosphazines, etc. and interpolymers, including block interpolymers containing repeating units from the above and grafts and blends containing any of the foregoing. Typical substituents providing substituted polymers include halogens such as fluoride, chloride and bromine; hydroxy groups, lower alkyl groups; lower alkoxy groups, monocyclic aryl; lower acyl groups and the like. The polymer may contain modifiers, plasticizers, fillers, etc.

A tubesheet is usually formed near at least one end of the membrane bundle, while a tubesheet or endsheet is advantageously present near the opposite ends of the fibers. In operation, the tubesheet and endsheet or the tubesheets are sealingly engaged with the housing. The tubesheet and endsheet together with the housing define a space external, typically an annular space, to membranes which does not communicate directly with the membranes.

The potting material used to form the tubesheet may be comprised of any suitable material. Advantageously, this invention enables a wide range of materials to be employed as the potting material. Preferably the potting material can be in an essentially liquid form when preparing the tubesheet and can thereafter be solidified, e.g., by cooling, curing, or the like. The solidified potting material should be relatively inert to moieties to which it will be exposed during fluid separation operation.

The potting material may be organic, inorganic or organic containing inorganic material, and the potting material may be natural or synthetic. Typical inorganic materials include glasses, ceramics, cermets, metals, and the like. Conveniently, the potting material comprises a solidifiable resin. Typical resins include phenolaldehyde resins, melamine-aldehyde resins, thermosetting artificial rubbers, acrylic resins, urethane resins, silicone resins, polysulfides, acetals, cellulosics, fluorocarbons, vinyls, styrenes, polyethylene, polypropylene, and other olefinically-unsaturated monomers, and the like. Particularly attractive potting materials are the epoxy resins, e.g., from polyglycyl resins preferably containing one or more diglycidyl ethers derived from resorcinol, catechol, hydroquinone, phlorogluicine, 4,4'-dihydroxybenzophenone, 1,1-bis(4-hydroxyphenyl) ethane, 2,2-bis(4-hydroxyphenyl) propane (Bisphenol A), bis(2-hydroxynaphthyl) methane, 2,2-bis(4-hydroxyphenyl) butane, 4,4'-dihydroxyphenyl phenyl sulfone, ethylene glycol, propylene glycol, butanediol, pentanediol, isopentanediol, in oleic dimer acid, poly(oxypropylene) glycol, 2,4,4'-trihydroxybisphenyl, 2,2'-4,4'-tetrahydroxybisphenyl, Bis-resorcinol F, 2,2'-4,4'-tetrahydroxybenzophenone, 1,1-bis(hydroxyphenyl) cyclohexane, bisphenolhexafluoroacetone, aniline, paraaminophenol, isocyanurate, cyanuiric chloride, hydantoin, tetraphenylene ethene, phenol-formaldehyde novolac, o-creson-formaldehyde novolac, cycloaliphatic epoxy resins, and the like. These resins may be substituted, e.g., with hydroxyl or halogen moieties, e.g., fluoride, chlorine and bromine (such as tetrabrominated bisphenol A).

Commonly, the epoxy is cured with a curing agent. Curing agents are well known in the art. The potting material may contain other components such as plasticizers, bond promoting agents, cure accelerators, thickening agents, dyes and pigments.

The separation device of the present invention may advantageously be used for fluid separations, including gas/gas, liquid/liquid or liquid/solid separations including separations or oxygen, nitrogen, methane or hydrogen from a mixture of gases. In addition, the separation device of the present invention has been described in conjunction with hollow fiber membranes; however, it is also useful for other membrane devices such as spiral would membranes.

I claim:
1. A separation device comprising
   a. one or more bundles of membranes;
   b. a housing designed to also function as a shipping crate, surrounding the bundle or bundles and providing an annular space for fluid around the bundle or bundles and sealed thereto in a fluid-tight relationship at each end of the bundle having a tubesheet, said housing being recloseably affixed around the bundle or bundles; and
   c. the housing is fabricated primarily from expanded polystyrene, expanded polyurethane, expanded polyethylene, fiberglass, asbestos, graphite, wood, or mixtures thereof.

2. The separation device of claim 1 in which the membranes are hollow fiber membranes.

3. The separation device of claim 1 in which the device is employed in a gas separation process.

4. The separation device of claim 1 further comprising
   1. means for introducing a fluid mixture into the device so as to produce a permeate portion passing through the membranes and a non-permeate portion which does not pass through the membranes;
   2. means for removing the non-permeate portion of the fluid mixture from the device; and
   3. means for removing the permeate portion of the fluid mixture from the device.

5. The separation device of claim 1 in which the annular space is non-uniform.

6. The separation device of claim 1 in which the annular space is non-cylindrical.

7. The separation device of claim 6 in which the non-uniform annular space is defined by an insert which is removably secured to the inside surface of the housing pieces.

8. A separation device comprising
   a. one or more bundles of membranes;
   b. a housing designed to also function as a shipping crate, surrounding the bundle or bundles and providing a nonuniform annular space for fluid around the bundle or bundles and sealed thereto in a fluid-tight relationship at each end of the bundle having a tubesheet, said housing being recloseably affixed around the bundle or bundles; and
   c. the nonuniform annular space is defined by one or more inserts which are removably secured to the inside surface of the housing.

* * * * *

UNITED STATES PATENT AND TRADEMARK OFFICE
CERTIFICATE OF CORRECTION

PATENT NO. : 5,282,966
DATED : Feb. 1, 1994
INVENTOR(S) : James B. Walker It is certified that error appears in the above-identified patent and that said Letters Patent is hereby corrected as shown below:    On title page,
At item [73] Assignee:   please add --and L'Air Liquide, S.A., Paris, France--

Signed and Sealed this

Twenty-fourth Day of May, 1994

Attest:

BRUCE LEHMAN

Attesting Officer

Commissioner of Patents and Trademarks